(12) United States Patent
Komura et al.

(10) Patent No.: US 8,223,597 B2
(45) Date of Patent: Jul. 17, 2012

(54) THERMALLY ASSISTED HEAD HAVING REFLECTION MIRROR FOR PROPAGATING LIGHT

(75) Inventors: Eiji Komura, Tokyo (JP); Tsutomu Chou, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 221 days.

(21) Appl. No.: 12/820,290

(22) Filed: Jun. 22, 2010

(65) Prior Publication Data

US 2011/0310713 A1 Dec. 22, 2011

(51) Int. Cl.
*G11B 11/00* (2006.01)

(52) U.S. Cl. .................. 369/13.33; 369/112.27; 360/59; 360/125.31

(58) Field of Classification Search ............... 369/13.33, 369/13.32, 13.24, 13.03, 13.02, 13.12, 13.35, 369/112.27; 360/59, 125.31, 125.74, 245.4; 385/126

See application file for complete search history.

(56) References Cited

U.S. PATENT DOCUMENTS

| | | | |
|---|---|---|---|
| 7,804,655 B2 * | 9/2010 | Shimazawa et al. | 360/59 |
| 7,864,635 B2 * | 1/2011 | Shimizu | 369/13.02 |
| 2008/0043360 A1 | 2/2008 | Shimazawa et al. | |
| 2008/0056073 A1 | 3/2008 | Shimizu | |
| 2011/0292772 A1 * | 12/2011 | Chou et al. | 369/13.33 |

FOREIGN PATENT DOCUMENTS

| JP | A-H09-241041 | 9/1997 |
|---|---|---|
| JP | A-2007-142227 | 6/2007 |

* cited by examiner

*Primary Examiner* — Ali Neyzari
(74) *Attorney, Agent, or Firm* — Posz Law Group, PLC (57) ABSTRACT

A magnetic head includes a magnetic head slider; and a laser diode that is positioned on a surface of a side opposite to a substrate of the magnetic head slider and that generates laser light; the magnetic head slider including: a core through which the laser light emitted from the laser diode propagates as propagating light; a cladding that covers the core and that has a refractive index that is smaller than that of the core; a near field light generating means that generates near field light from the propagating light on an air bearing surface; and a main pole for recording that is disposed adjacent to the near field light generating means and of which an edge part is positioned on the air bearing surface. The core includes a reflection layer and a seed layer, the reflection layer has a refractive index smaller than that of the core, and has a reflection surface on which laser light emitted from the laser diode reflects so as to enter the core as the propagating light, and the seed layer is positioned on a back surface of the reflection surface of the reflection layer and suppresses plasmon generation on the reflection surface.

11 Claims, 10 Drawing Sheets

THERMALLY ASSISTED HEAD HAVING REFLECTION MIRROR FOR PROPAGATING LIGHT

BACKGROUND OF THE INVENTION

1. Field of the Invention

The present invention relates to a thermally-assisted type magnetic head.

2. Description of the Related Art

In recent years, in association with the high recording density of magnetic recording devices such as hard disk devices, there has been a demand for improvement in the performance of thin film magnetic heads and magnetic recording media. Composite-type thin film magnetic heads have been widely used for the thin film magnetic head. The composite-type thin film magnetic head includes a reproducing head having a magneto resistive effect element (hereafter, referred to as an MR element) for reading and a recording head having an inductive electromagnetic transducer (a magnetic recording element) for writing, with both heads being laminated on a substrate. The thin film magnetic head incorporated in the hard disk device flies just above a surface of the magnetic recording medium during recording and reproducing processes.

The magnetic recording medium is a discontinuous medium where magnetic microparticles gather. Each of the microparticles has a single magnetic domain structure. In the magnetic recording medium, one recording bit is structured with a plurality of magnetic microparticles. In order to increase the recording density, asperity of a boundary between adjacent recording bits needs to be small. For this, the size of the magnetic microparticles needs to be decreased. However, when the size of the magnetic microparticles is decreased, the volume of the microparticles decreases. Accordingly, thermal stability of magnetization of the magnetic microparticles also decreases. In order to solve this problem, increasing anisotropic energy of the magnetic microparticles is effective. However, when the anisotropic energy of the magnetic microparticles is increased, the coercive force of the magnetic recording medium is also increased. As a result, it becomes difficult to record information with a conventional magnetic head. Conventional magnetic recording has such a drawback, and this is a large obstacle to achieving an increase in the recording density.

To solve this problem, one method known as so-called thermally-assisted magnetic recording is proposed. This method uses a magnetic recording medium having a large coercive force. A magnetic field and heat are simultaneously added to a part of the magnetic recording medium where information is recorded when information is recorded. With this method, the temperature of the part where the information is recorded is increased. Therefore, the coercive force decreases, and the information is able to be recorded.

In thermally-assisted magnetic recording, a method that uses near field light is known as a method to provide heat to the magnetic recording medium. The near field light is a type of electromagnetic field that is generated around a substance. Ordinary light cannot be focused to a region that is smaller than its wavelength due to diffraction limitations. However, when light having an identical wavelength is irradiated on to a microstructure, near field light corresponding to the scale of the microstructure is generated, enabling the light to be focused on to a minimal region, such as a region only tens of nm in size. As a practical method to generate the near field light, a method to generate laser light using a laser diode and to generate the near field light from plasmon excited by the laser light is generally known. The near field light is generated with a metal that is referred to as a probe that is a plasmon antenna.

Direct irradiation of light generates the near field light in the plasmon antenna. However, with this method, a conversion efficiency to convert irradiated light into the near field light is low. Most of the energy of the light irradiated to the plasmon antenna reflects from the surface of the plasmon antenna or is converted into thermal energy. The size of the plasmon antenna is set to be the wavelength of the light or less. Accordingly, the volume of the plasmon antenna is small. Therefore, the temperature of the plasmon antenna significantly increases as a result of the above-described generation of heat.

Due to the temperature increase, the volume of the plasmon antenna expands, and the plasmon antenna protrudes from an air bearing surface that is a surface facing the magnetic recording medium. Accordingly, the distance of an edge part of the MR element positioned on the air bearing surface from the magnetic recording medium increases. As a result, a problem in which servo signals recorded on the magnetic recording medium are barely sensed during the recording process.

Currently, a technology that does not directly irradiate light to the plasmon antenna is proposed. For example, there is a known technology where propagating light entering from a laser diode and propagating through a core of a waveguide such as an optical fiber is coupled in a surface plasmon polariton mode through a buffer portion to a plasmon generator so that the surface plasmon is excited in the plasmon generator. The plasmon generator includes an edge of plasmon generator that is positioned on the air bearing surface and that generates the near field light, and a propagation edge facing the waveguide through the buffer portion. At the interface between the core and the buffer portion, the light propagating through the core is totally reflected. However, at the same time, light penetrating to the buffer portion is generated, which is referred to as evanescent light. When the evanescent light and collective oscillation of charges in the plasmon generator are coupled, the surface plasmon is excited in the plasmon generator. The excited surface plasmon propagates to the edge of plasmon generator along the propagation edge, and generates the near field light at the edge of plasmon generator. According to this technology, the light propagating through the core is not directly irradiated to the plasmon generator so that an excessive temperature increase in the plasmon generator can be prevented.

The laser light emitted from the laser diode preferably propagates to the vicinity of the air bearing surface through a straight-shaped path in order to prevent generation of propagation loss. Variation of a propagating direction of propagating light due to reflection, refraction or the like contributes to generate large propagation loss. For this, the laser diode is preferably attached such that an outgoing surface of the laser diode faces the air bearing surface of the magnetic head slider, i.e., such that an outgoing direction of laser light is orthogonal to the air bearing surface. If the laser diode is attached as described above, the propagating light propagates straight to the vicinity of the air bearing surface without the propagating direction being changed along the way.

In order to attach the laser diode such that the outgoing surface of the laser diode faces the air bearing surface of the magnetic head slider, the laser diode needs to be attached on a backside surface of the air bearing surface of the magnetic head slider. Such an example is disclosed in Japanese laid-open patent application publication number 2008-47268.

The magnetic head slider is manufactured by making a large number of magnetic head sliders on a wafer and cutting the wafer into individual magnetic head sliders. The backside surface is hidden inside the wafer in a wafer state, and the backside surface is first exposed when the wafer is cut into row bars. Therefore, a step for attaching the laser diode to the magnetic head slider is performed at the earliest after the wafer is cut into the row bars. Ordinarily, the laser diode is attached to each slider after a step of separating into the sliders. As described above, it is impossible in principle to attach the laser diode on the backside surface of the air bearing surface of the magnetic head slider during the wafer process. This is a serious problem from a standpoint of manufacturing efficiency of the magnetic head.

To maximize the manufacturing efficiency of the magnetic head, it is desirable to attach the laser diode to the wafer during the wafer process. In this case, an attached surface of the laser diode necessarily is an opposite-side surface of a substrate of the wafer (a lamination direction upper surface in the wafer process). In such a configuration, laser light emitted from the laser diode needs to be turned 90 degrees at least once on the path. As a method to achieve this, a method using mirrors is known.

In Japanese laid-open patent application publication number 2007-142227, a bent waveguide where a plurality of corner mirrors is disposed is disclosed. Each corner mirror is formed by obliquely chamfering a corner of a semiconductor at 45 degrees by etching. The light reflects due to the difference of refractive indices of the semiconductor and air on a chamfered surface, and propagates through the waveguide.

In Japanese laid-open patent application publication number 2008-59645, a thermally-assisted type magnetic head providing a mirror configuration is disclosed. A laser diode is disposed on the outside of the magnetic head slider, and an edge surface of an active layer sandwiched by cladding layers is obliquely formed. The laser light is emitted from the laser diode, immediately turns 90 degrees, and then enters the waveguide in the slider.

However, with the method using the mirrors as described above, a large loss in the propagating efficiency occurs when the propagating light is reflected.

The object of the present invention is to provide a magnetic head of a thermally-assisted magnetic recording system where laser light emitted from the laser diode reflects to be introduced into the core, and to a magnetic head of the thermally-assisted magnetic recording system which improves manufacturing efficiency and has a small propagation loss associated with the propagating light.

SUMMARY OF THE INVENTION

A magnetic head of the present invention includes a magnetic head slider; and a laser diode that is positioned on a surface of a side opposite to a substrate of the magnetic head slider and that generates laser light; the magnetic head slider including: a core through which the laser light emitted from the laser diode propagates as propagating light; a cladding that covers the core and that has a refractive index that is smaller than that of the core; a near field light generating means that generates near field light from the propagating light on an air bearing surface; and a main pole for recording that is disposed adjacent to the near field light generating means and of which an edge part is positioned on the air bearing surface. The core includes a reflection layer and a seed layer, the reflection layer has a refractive index smaller than that of the core, and has a reflection surface on which laser light emitted from the laser diode reflects so as to enter the core as the propagating light, and the seed layer is positioned on a back surface of the reflection surface of the reflection layer and suppresses plasmon generation on the reflection surface.

The laser light emitted from the laser diode reflects from the reflection surface of the reflection layer and enters the core. On the reflection surface, a surface plasmon is generated between the entering laser light and the reflection surface; therefore, a part of the energy of the laser light is dissipated. However, because a seed layer, which is configured to suppress plasmon generation on the reflection surface, is disposed on a back surface of the reflection layer, the plasmon generation is suppressed, and a propagation loss of the light on the reflection layer is suppressed. Further, since the laser diode is positioned at a surface of the opposite side to the substrate of the magnetic head slider (above the magnetic head slider in the lamination direction of the magnetic head slider), the laser diode can be disposed on the magnetic head slider in its wafer state, thereby increasing production efficiency.

As described above, according to the present invention, a magnetic head of a thermally-assisted magnetic recording system is provided, the magnetic head having improved manufacturing efficiency and having a smaller propagation loss.

The above description, as well as other objects, features, and advantages of the present invention will be evident from the following description with reference to attached drawings illustrating the present invention.

DETAILED DESCRIPTION OF THE INVENTION

Figure 1:
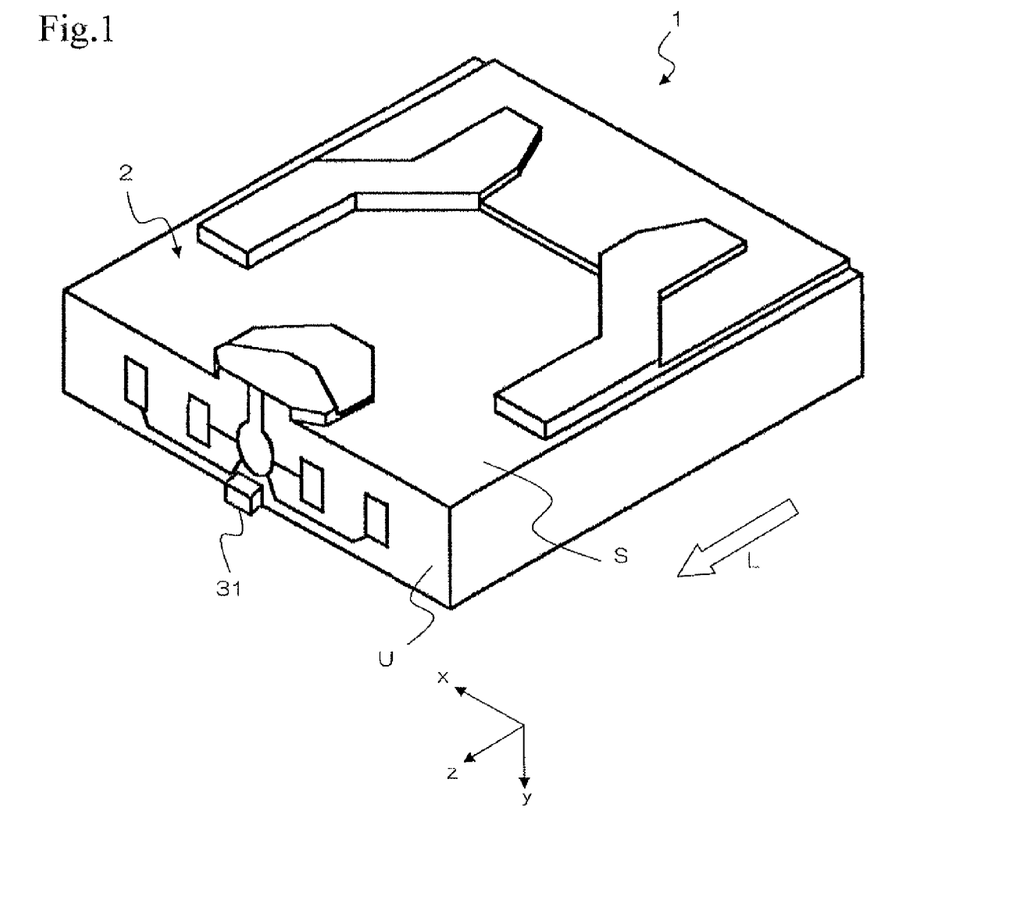
FIG. 1 is a perspective view of a magnetic head of the present invention.
Figure 2:
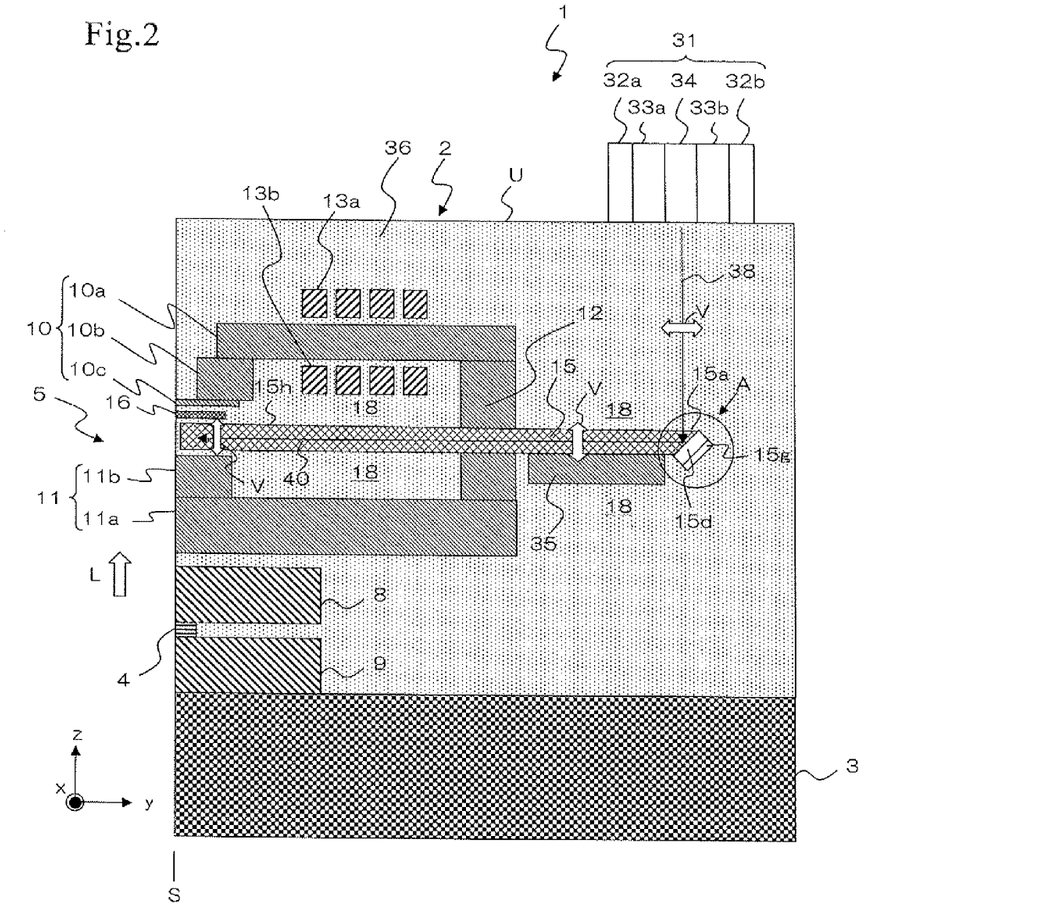
FIG. 2 is a cross-sectional view of a main part of the magnetic head of the present invention.

A magnetic head of the present invention will be explained referring to the drawings. FIG. 1 is an entire perspective view of the magnetic head according to one embodiment of the present invention. FIG. 2 is a cross-sectional view of a main part of the magnetic head. In this specification, a lamination direction L means a film formation direction in a wafer process and corresponds to the z-direction in each of the drawings. "Upward lamination direction" means a direction oriented toward an overcoat layer 36 from a substrate 3, and "downward lamination direction" means a direction oriented toward the substrate 3 from the overcoat layer 36.

A magnetic head 1 includes a magnetic head slider 2 and a laser diode 31. The laser diode 31 is firmly attached to the magnetic head slider 2 and generates laser light. The magnetic head slider 2 has an approximately hexahedral shape, and one surface of the six outer surfaces is an air bearing surface S facing a magnetic recording medium. The laser diode 31 is positioned on a surface U, which is on an opposite side of the substrate 3 of the magnetic head slider 2 (an upper surface of the magnetic head slider 2 in the lamination direction L). In other words, the laser diode 31 is positioned on an upper surface of the overcoat layer 36. The laser diode 31 emits the laser light toward the substrate 3 in a direction perpendicular to the surface U inside the magnetic head slider 2.

The magnetic head 1 includes an MR element 4, an upper side shield layer 8 and a lower side shield layer 9. The MR element 4 is positioned in a manner of exposing its tip part on the air bearing surface S. The upper side shield layer 8 and the lower side shield layer 9 are disposed so as to sandwich the MR element 4 from upper and lower sides in the lamination direction. These elements configure a reproducing head part. The MR element 4 can have any configuration where a magneto resistive effect is utilized, such as a current in plane (CIP)—giant magneto resistive (GMR) element where sense current flows in a direction (x-direction) that is parallel to a film surface, a current perpendicular to plane (CPP)—GMR element where the sense current flows in a direction (z-direction) that is perpendicular to the film surface or a tunneling magneto resistive (TMR) element where a tunnel effect is utilized. When the CPP-GMR element and the TMR element are applied, the upper side shield layer 8 and the lower side shield layer 9 are also utilized as electrodes to supply the sense current.

The magnetic head 1 includes a magnetic recording element 5 for so-called perpendicular magnetic recording, which configures a recording head part. The magnetic recording element 5 includes a main pole 10 for recording. The main pole 10 is adjacently disposed to a plasmon generator 16, which will be described below. The main pole 10 includes a first body part 10a, a second body part 10b and a magnetic pole tip part 10c, which are made of an alloy of any two or three of Ni, Fe and Co. The magnetic pole tip part 10c that is an edge part of the main pole 10 is positioned on the air bearing surface S. A return shield layer 11 is disposed in the downward lamination direction of the main pole 10. The return shield layer 11 includes a first body part 11a and a second body part 11b, which are also made of an alloy of any two or three of Ni, Fe and Co. The main pole 10 and the return shield layer 11 are magnetically linked to each other via a contact part 12. In the present embodiment, the return shield layer 11 is disposed below the main pole 10 in the lamination direction, but may be disposed above the main pole 10 in the lamination direction. The overcoat layer 36 made of $Al_2O_3$ is disposed above the main pole 10 in the lamination direction.

Coils 13a and 13b are wound adjacent to the main pole 10, and are centered around the contact part 12. FIG. 2 illustrates only portions of the coils on the air bearing surface S side from the contact part 12. A magnetic flux is generated at the main pole 10 due to an external current applied to the coils 13a and 13b. The coils 13a and 13b are formed of a conductive material such as Cu or the like. Two layers of the coils 13a and 13b are established in the present embodiment, but one layer or three layers or more are also practical. Further, the number of windings is four in the present embodiment, but is not limited to four.

Figure 3:
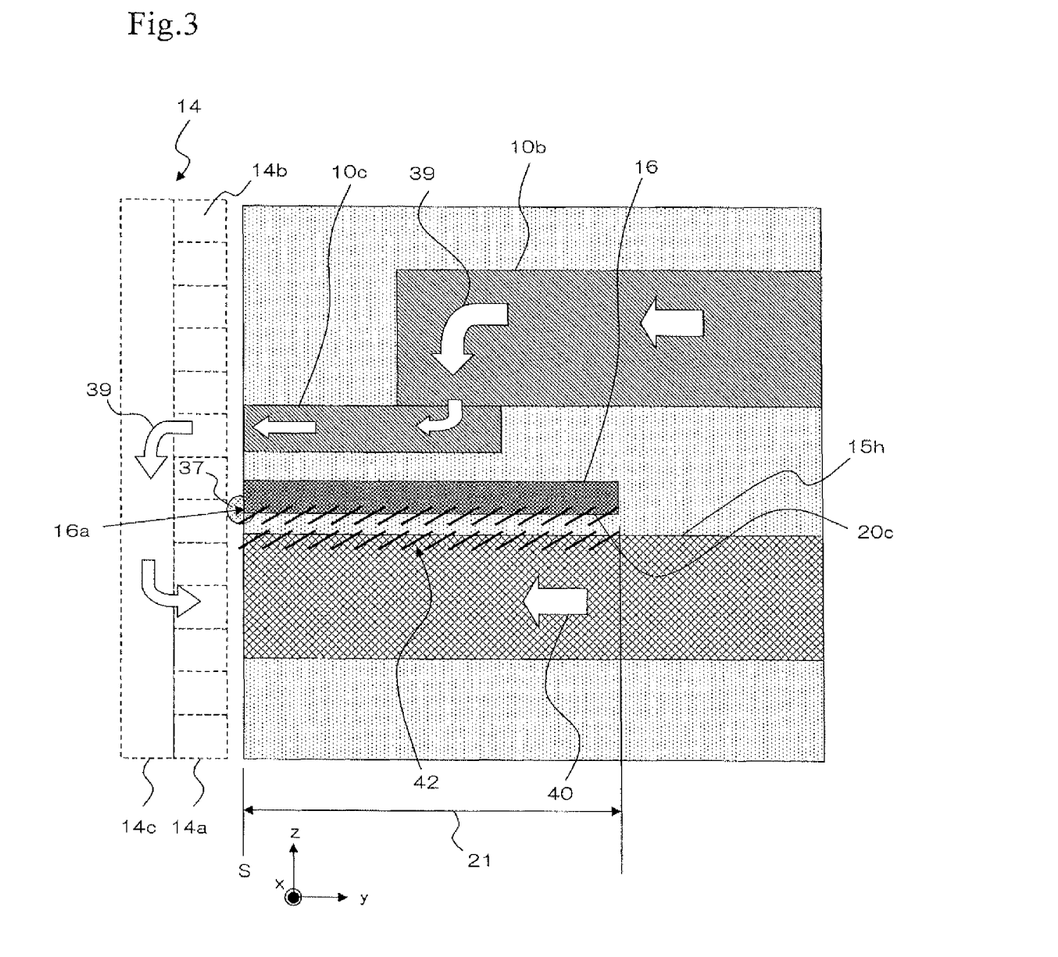
FIG. 3 is an enlarged view of the vicinity of a magnetic recording element of the magnetic head illustrated in FIG. 2.

The main pole 10 is tapered at the magnetic pole tip part 10c that is near the air bearing surface S not only in the film surface orthogonal direction (z-direction) but also in the track width direction (x-direction). Referring to FIG. 3, a magnetic flux 39 generated inside the main pole 10 is tapered as it travels to the air bearing surface S. Then, the magnetic flux 39 is discharged from the magnetic pole tip part 10c positioned on the air bearing surface S toward a magnetic recording medium 14 as a minute and strong magnetic flux 39 for writing corresponding to the high recording density. The magnetic recording medium 14 has a configuration for perpendicular magnetic recording. A surface layer of the magnetic recording medium 14 is a recording layer 14a, and the magnetic flux 39 discharged from the magnetic pole tip part 10c travels through the recording layer 14a in a perpendicular direction (y-direction). Accordingly, each of the recording bits 14b of the recording layer 14a is magnetized in the perpendicular direction. The magnetic flux 39 passes through the recording layer 14a and it magnetic path turns to an in-plane direction (z-direction) of the magnetic recording medium 14 in an under layer 14c made from a soft magnetic body that is positioned below the recording layer. Further, the magnetic flux 39 changes direction in the perpendicular direction (y-direction) again in the vicinity of the return shield layer 11 and is absorbed by the return shield layer 11. In other words, the return shield layer 11 functions to control the magnetic flux 39 such that the magnetic flux 39 perpendicularly passes through the recording layer 14a and creates a U-shaped magnetic flux path.

Further, the second body part 11b of the return shield layer 11 forms a trailing shield part where a layer cross section is wider in the track width direction (x-direction) than that of the first body part 11a. The placement of the return shield layer 11 causes a steep gradient in the magnetic field between the return shield layer 11 and the main pole 10 in the vicinity of the air bearing surface S. As a result, signal output jitter is reduced and an error rate at the time of reading is decreased.

Figure 4:
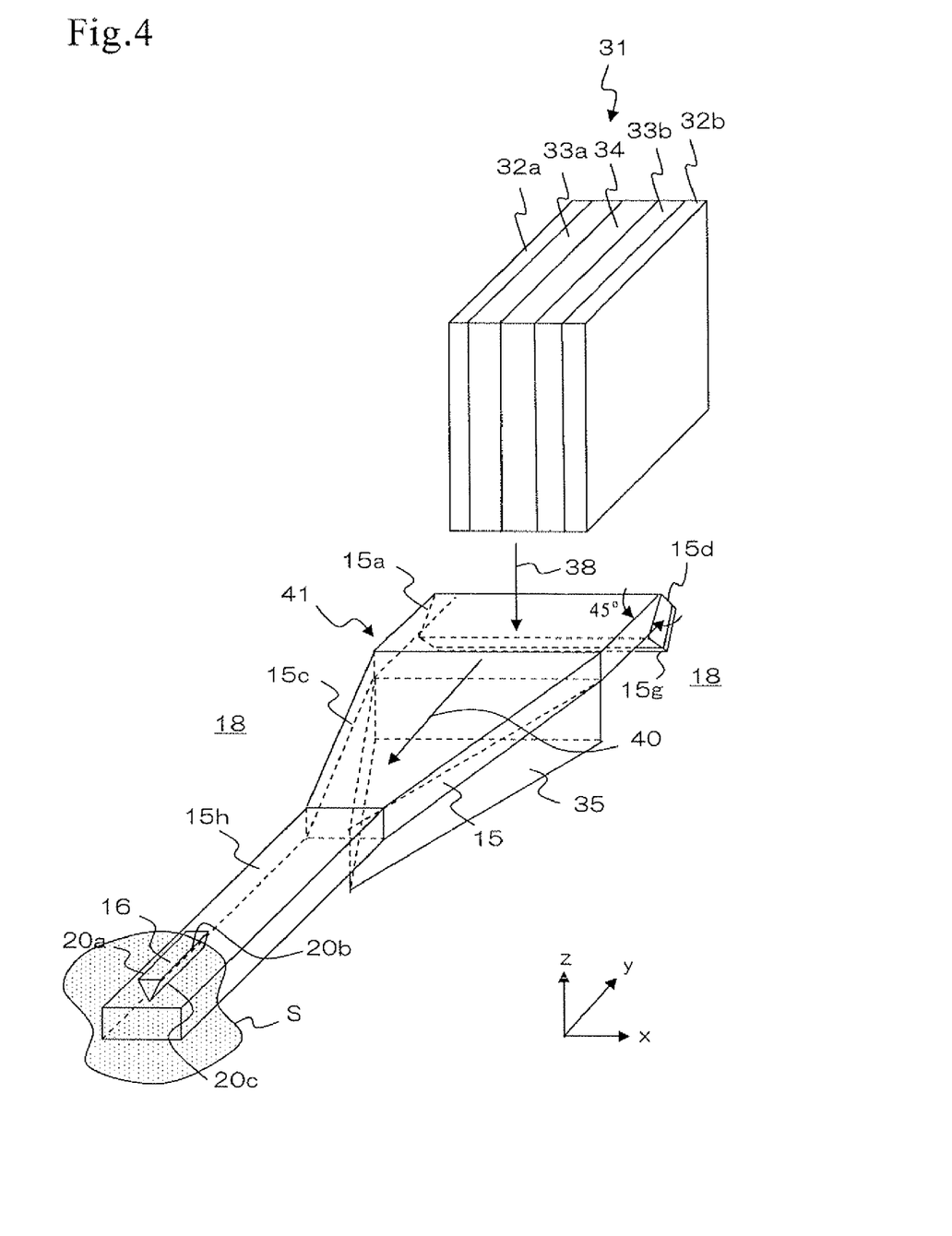
FIG. 4 is a conceptual perspective view of a near field generator and a laser diode.

The magnetic head 1 includes a near field generator 41 for generating near field light. FIG. 4 is a perspective view illustrating an entire configuration of the near field generator and a laser diode. The near field generator 41 includes a core 15 through which laser light 38 generated in the laser diode 31 propagates as propagating light 40, a cladding 18 that covers the core 15 and that has a smaller refractive index than the core 15, a plasmon generator 16 that generates the near field light on the air bearing surface S and that extends to the air bearing surface S along the core 15 as facing a part of the core 15. The near field light is also generated by a plasmon antenna as mentioned in the above section that discussed related art. In this configuration, a conductive plate-shaped member disposed on a light outgoing surface of a tip of the core 15 generates the near field light.

As mentioned below, in the magnetic head 1, the laser light 38 generated in the laser diode 31 reflects from a reflection surface 15e of a reflection layer 15d in a direction perpendicular to the air bearing surface S, and propagates through the core 15 as propagating light 40. In the magnetic head 1, the near field light is generated on the air bearing surface by a near field light generating means, and thereby a recording part of the recording medium is heated. As the near field light generating means, one of two means is utilized; one in which the conductive plate-shaped member directly generates the near field light from the propagating light propagating through the core 15; and one in which the plasmon generator 16 indirectly generates the near field light. Hereafter, an embodiment utilizing the plasmon generator 16 will be explained below.

Figure 2A:
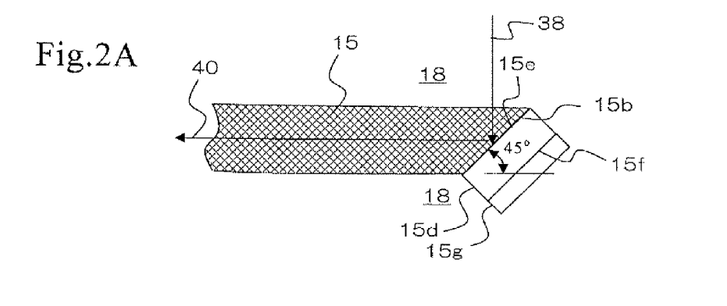
FIG. 2A is an enlarged view of portion A of FIG. 2.

As illustrated in FIG. 2A, the core 15 extends from the inside of the magnetic head slider 2 to either the air bearing surface S or in the vicinity thereof. A cross section of the core 15 that is orthogonal to the propagating direction D of the propagating light 40 is rectangular. In the following explanation, the "thickness" of the core 15 indicates a length in the z-direction, and the "width" of the core 15 indicates a length in the x-direction. Of the core 15, the width is larger than the thickness.

When the wavelength of the laser light (the propagating light) is 600 nm, the cladding 18 is formed, for example, of $SiO_2$ and the core 15 is formed, for example, of $Al_2O_3$. When the cladding 18 is formed of $Al_2O_3$, the core 15 is formed, for example, of tantalum oxide (TaOx). When the wavelength of the laser light (the propagating light) is 800 nm, the cladding 18 is formed, for example, of $Al_2O_3$ and the core 15 is formed, for example, of TaOx. TaOx means herein any titanium oxide compound. $Ta_2O_2$, TaO, $TaO_2$, etc. are typical, however, it is not limited to these materials.

Referring to FIGS. 2 and 2A, one end of the core 15 (hereafter, referred to as a starting point 15a in consideration of a propagating path of the propagating light) is positioned at a place that overlaps with a light path of the laser light 38 emitted from the laser diode 31, and is chamfered at an angle of 45 degrees. A reflection layer 15d whose refractive index is smaller than that of the core 15 is formed at a slant end 15b. The reflection surface 15e of the reflection layer 15d configures a mirror, and reflects and guides the laser light 38 emitted from the laser diode 31 into the core 15 as the propagating light 40. The reflection layer 15d is made of gold, silver, copper or aluminum, or consists primarily of one of these materials.

A seed layer 15g is formed on a back surface 15f of the reflection layer 15d that is opposite to the reflection surface 15e. Many types of materials can be applied to the seed layer 15g as long as plasmon generation on the reflection surface 15e is suppressed. However, particularly, the seed layer 15g preferably is formed of tantalum (Ta) or titanium (Ti), or consists primarily of one of these materials.

A cross section narrowing part 15e is formed in the vicinity of the starting point 15a of the Core 15. Cross sections of the cross section narrowing part 15c gradually are narrowed along the propagating direction D of the propagating light 40. Specifically, the cross section narrowing part 15c has a trapezoidal plane shape where the thickness is constant and the width tapers. A spot diameter of the laser light, which is reflected by the reflection layer 15d and is guided into the core 15 as the propagating light 40, is narrowed at the cross section narrowing part 15c.

The core 15 preferably includes a spot size converter 35 that tapers the spot diameter of the propagating light 40. The spot size converter 35 has a triangular prism shape that is formed in an integrated manner with the core 15 and that is formed of the same material as the core 15. The spot diameter is narrowed only in the cross section narrowing part 15c; however, a presence of the spot size converter 35 enables the spot diameter to be more efficiently tapered.

The other end side of the core 15 extends between the main pole 10 and the return shield layer 11. The core 15 ends in the vicinity of the air bearing surface S; however, the core 15 may extend to the air bearing surface S. Although not illustrated in the drawings, the cladding 18 is disposed between the core 15 and the contact part 12.

The propagating light is ordinarily able to propagate through the core 15 in two types of modes. One is a propagation mode where an oscillation direction of an electric field in a cross section orthogonal to the propagating direction D of the propagating light 40 is in a thickness direction (z-direction). The other is a propagation mode where the oscillation direction of the electric field of the propagating light 40 is in a width direction (y-direction) of the core 15. The plasmon generator 16, which will be described below, extends to the air bearing surface S and faces an upper surface 15h of the core 15. A surface plasmon is generated when the plasmon generator 16 is positioned at a position facing an oscillation direction V of the electric field of the propagating light 40. Accordingly, in order to generate the surface plasmon in the plasmon generator 16, it is required that the oscillation direction V of the electric field is oriented toward the z-direction.

Figure 5:
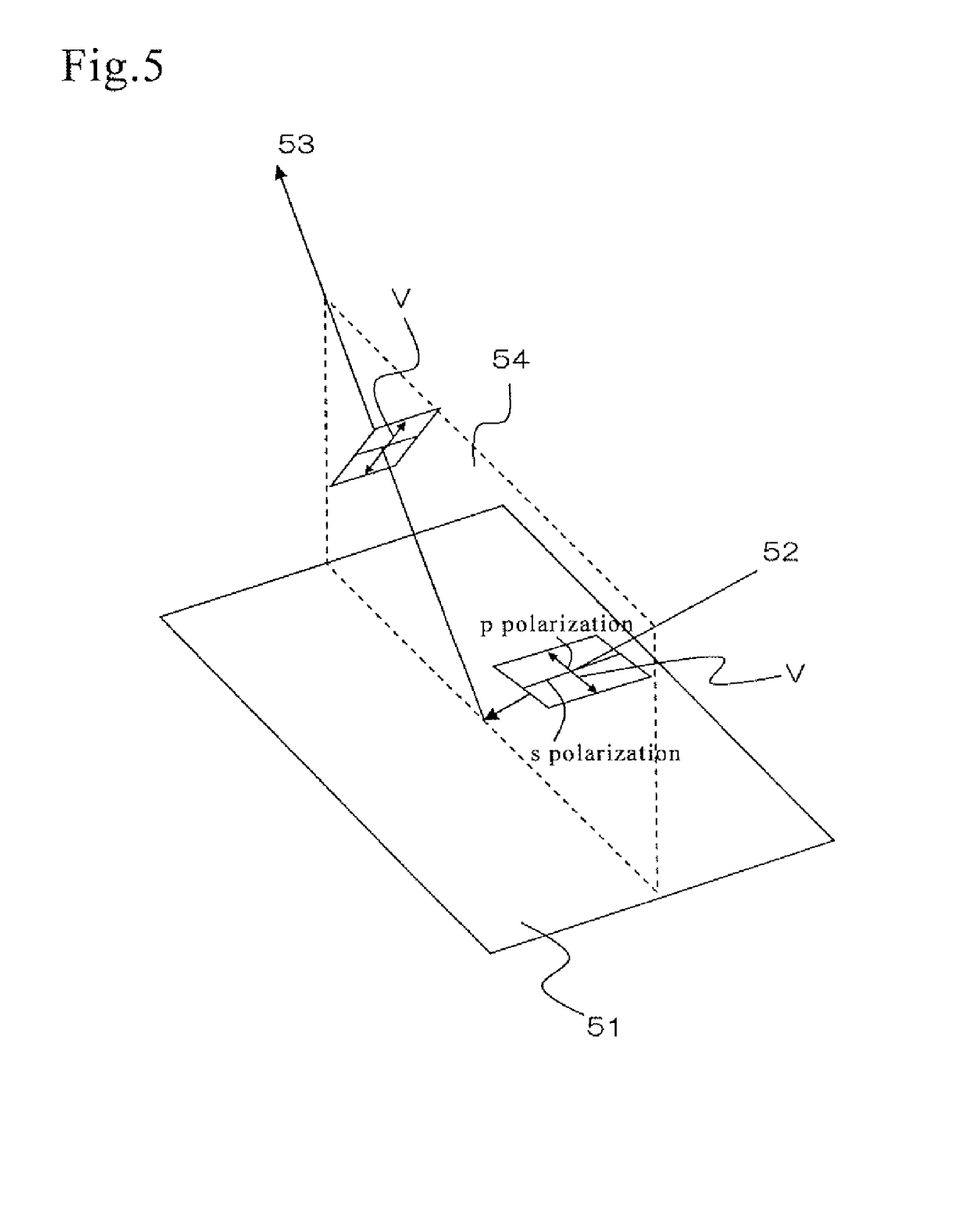
FIG. 5 is an explanatory view of p polarization and s polarization.

The laser light is designed to polarize and to be emitted so that the oscillation direction of the electric field may be in-plane with an entering surface of the laser light. This part will be further explained referring to FIG. 5. When the laser light is obliquely incident on a reflection surface 51 and reflects from the reflection surface 51, a plane formed by entering light 52 and reflection light 53 of the laser light is referred to as an entering surface 54. When an oscillation component V of the electric field of the laser light is in-plane with the entering surface 54, it is understood that the light has p polarization. When the oscillation component V is orthogonal to the entering surface 54, it is understood that the light has s polarization. The oscillation component of the electric field of the s polarization is in the width direction of the core 15, i.e., a width direction of the plasmon generator 16, and thereby collective oscillation of charges is less likely to be excited in the plasmon generator 16. In other words, the surface plasmon is less likely to be generated. Meanwhile, the electric field of the p polarization oscillates in a thickness direction of the plasmon generator 16. Accordingly, the surface plasmon is more likely to be generated. Therefore, the laser light is required to have the p polarization.

When the laser light of the p polarization reflects from the reflection layer 15d of the core 15, the surface plasmon is also generated on the reflection layer 15d according to the same principle. Accordingly, some light energy is dispersed at the time of reflection. In the present invention, the above-described seed layer 15g is disposed on the back surface 15f of the reflection layer 15d. The seed layer 15g has an effect to suppress a generation of the surface plasmon so that loss of the light energy at the time of reflection is suppressed.

The magnetic head 1 incorporates a laser diode 31 that generates the laser light. The laser diode 31 has a pair of electrodes 32a and 32b, P (positive) type and N (negative) type claddings 33a and 33b that are sandwiched by these electrodes, an active layer 34 positioned between the claddings 33a and 33b, and a cleavage surface that has a reflecting minor structure. The active layer 34 where the laser light continuously oscillates is arranged on a perpendicular line, which is aligned orthogonally relative to the core 15 from the starting point 15a of the core 15. The laser light generated in the active layer 34 is designed to enter into the core 15 from a direction orthogonal to the core. The wavelength of the laser light is not particularly limited, but laser light having a wavelength of approximately 800 nm is preferably used.

The plasmon generator 16 extends to the air bearing surface S as facing a part of the core 15. The plasmon generator 16 is formed of Au, Ag, Cu, Al, Pd, Ru, Pt, Rh, Ir or of an alloy consisting primarily of these metals. The plasmon generator 16 is a metallic piece having a substantially-triangular prism shape with a triangular cross section. Three apexes of the plasmon generator 16 on the triangular cross section respectively form three edges 20a, 20b and 20c that extend along the longitudinal direction (y-direction) of the plasmon generator 16. Thus, the plasmon generator 16 is formed such that one apex on the triangular cross section faces the core 15, and this apex forms the propagation edge 20c facing the core 15.

Referring to FIG. 3, the propagation edge 20c has an overlapping part 21 that overlaps with the core 15 in the longitudinal direction (y-direction) of the plasmon generator 16. The overlapping part 21 generates surface plasmon 42 by coupling the propagating light 40 propagating in the core 15 in a surface plasmon mode. An edge 16a of plasmon generator is formed at the edge of the side of the air bearing surface S of the plasmon generator 16. The edge 16a of the plasmon generator is positioned in the vicinity of the magnetic pole tip part 10c on the air bearing surface S. The surface plasmon 42 generated in the overlapping part 21 propagates to the edge 16a of the plasmon generator along the propagation edge 20c. Near field light 37 is generated from the edge 16a of the plasmon generator. Then, as described above, when information is recorded, heat and a magnetic field are simultaneously applied to a portion of the magnetic recording medium 14 where information is recorded. Thereby, the temperature of the portion where information is recorded is increased and the coercive force is decreased so that the information is recorded.

Next, suppression of the generation of the surface plasmon by the seed layer 15g was confirmed by simulation. In each case, which will be described below, the core 15 was formed of tantalum oxide, and the periphery of the core 15 except where the reflection layer 15d existed was covered by the cladding 18 made of $Al_2O_3$. In FIGS. 6A-6F, darkened areas of the core 15 indicate an area where energy of the propagating light 40 is high.

Figures 6A, 6C:
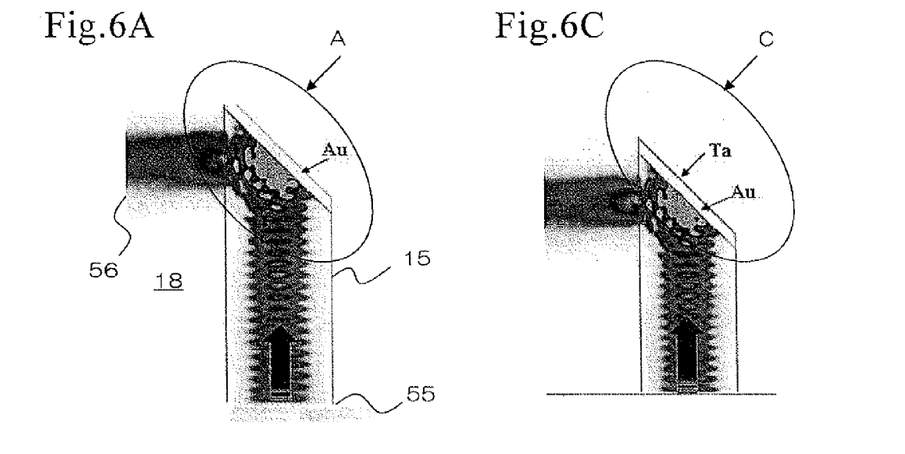
FIGS. 6A-6F are conceptual views illustrating laser light reflections of embodiments and comparative examples.
Figure 6B:
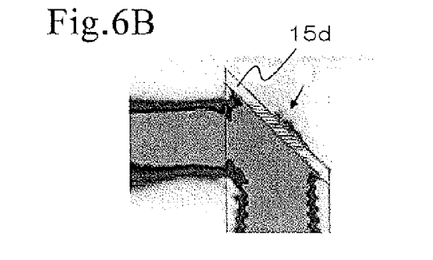

FIG. 6A illustrates an example where a reflection layer 15d, which is made of Au and has a thickness of 200 nm, is disposed on the slant end 15b of the core 15. FIG. 6B is an enlarged view of portion A in FIG. 6A. A condition where the propagating light 40 penetrates into the inside of the reflection layer 15d is observed as indicated by the arrow in FIG. 6B. A refractive index of the light, which is defined as a ratio of light energy on an outgoing surface 56 of the core 15 with respect to light energy on an entering surface 55 of the core 15, was 61.7%.

Figure 6D:
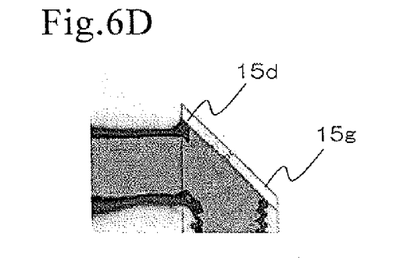

FIG. 6C illustrates an example where a seed layer 15g, which is made of tantalum and has a thickness of 20 nm, is disposed on the back surface of the reflection layer 15d in the model illustrated in FIG. 6A. FIG. 6D is an enlarged view of portion C in FIG. 6C. A condition where the propagating light 40 penetrates into the inside of the reflection layer 15d is suppressed is observed in FIG. 6C. The refractive index of the light was 81.3%.

Figure 6E:
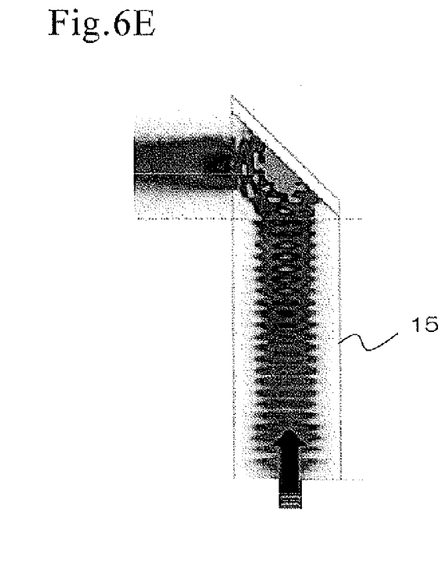
Figure 6F:
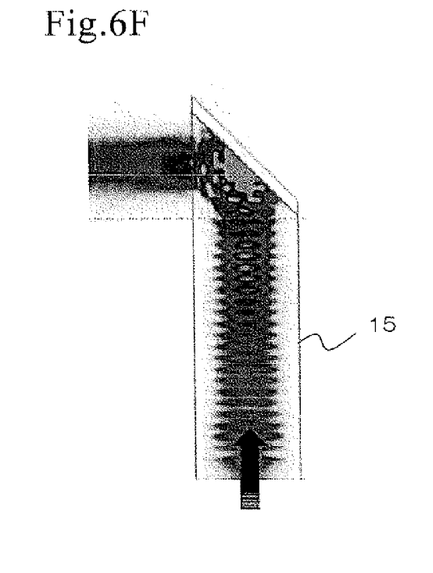

FIG. 6E illustrates an example where Cu having a thickness of 200 nm is used for a reflection layer 15d and the seed layer 15g made of tantalum and having a thickness of 20 nm is disposed as in FIG. 6C. FIG. 6F illustrates an example where Ag having a thickness of 200 nm is used for the reflection layer 15d and the seed layer 15g made of tantalum and having a thickness of 20 nm is disposed as in FIG. 6C. The examples are the same as FIG. 6C except for that the materials of the reflection layer 15d are different. The refractive index in the case of FIG. 6E was 75.8%, and the refractive index in the case of FIG. 6F was 76.1%. Other materials can be also used for the reflection layer 15d as long as a refractive index of the materials is high but still less than that of the core in order to satisfy a total reflection condition. For example, aluminum (Al) is a preferable material for the reflection layer 15d.

Figure 7:
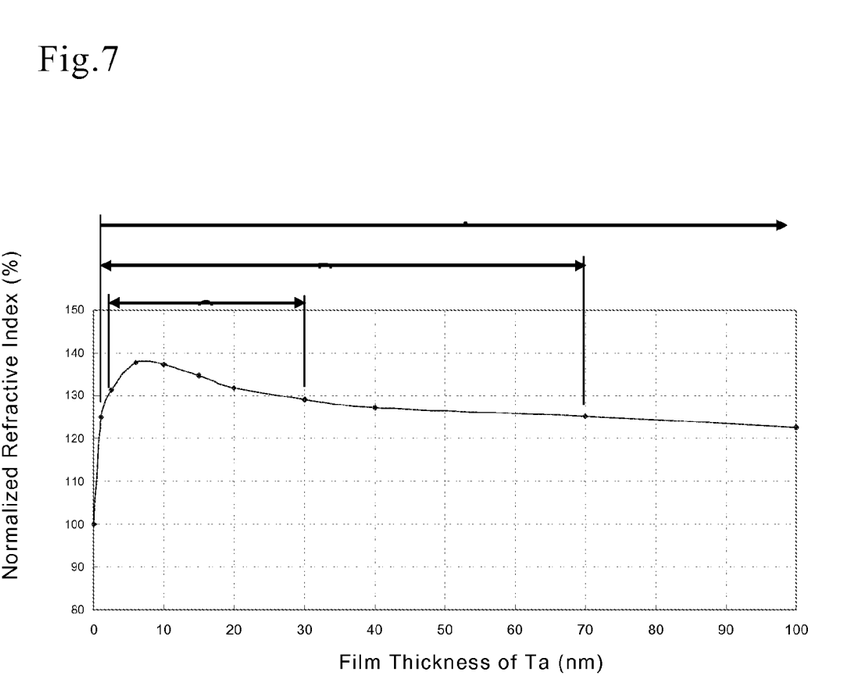
FIG. 7 is a graph illustrating a relationship between the film thickness of a tantalum seed film and the refractive index.

Next, in order to observe a relationship between a film thickness and a refractive index of the seed layer 15g, the refractive index variations were calculated as a film thickness of the seed layer 15g made of tantalum was varied in a range of 1 nm to 100 nm. A reflection layer 15d made of Au with a thickness of 200 nm was used. As illustrated in FIG. 7, an arrangement of a tantalum layer having a thickness of 1 nm greatly increases the refractive index. The refractive index gradually decreases in the vicinity of a film thickness of 5 nm. However, compared to the case where the seed layer 15g is not disposed (when the film thickness is 0 nm), the refractive index was higher when the film thickness was 100 nm or less (area A in the graph). A range where the refractive index increases 25% or more as compared to the case where the seed layer 15g is not disposed was from 1 nm to 70 nm (area B of the graph). A range where the refractive index increases 30% or more was from 2 nm to 30 nm (area C of the graph). Although explanations are omitted, the same tendency is obtained when titanium is used for the seed layer 15g, and it is assumed that the same tendency is obtained when the primary component is tantalum or titanium. The primary component of tantalum or titanium means that an atomic fraction of tantalum or titanium is the largest among elements configuring the seed layer 15g.

Figure 8A:
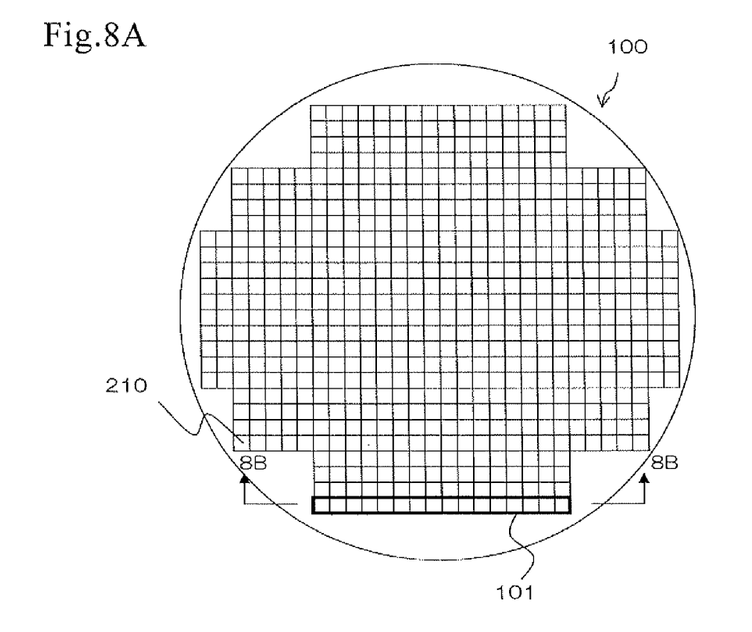
FIG. 8A is a plan view of a wafer according to a method of manufacturing the magnetic head of the present invention.
Figure 8B:
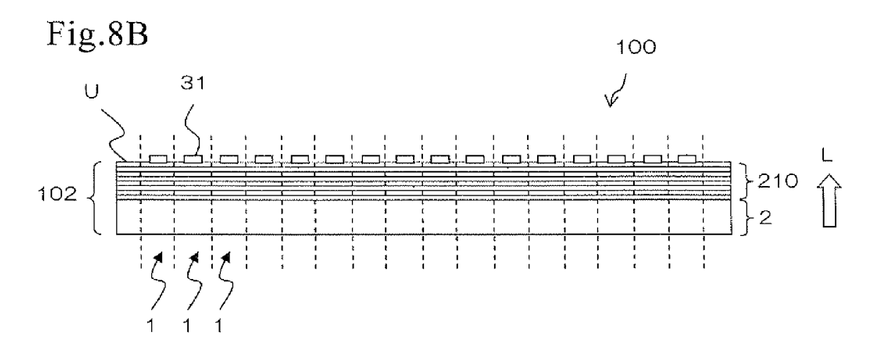
FIG. 8B is a cross-sectional view of a wafer according to a method of manufacturing the magnetic head of the present invention.

FIG. 8A is a plan view of a wafer that is used for manufacturing a magnetic head. FIG. 8B is a cross-sectional view of the wafer cut along line 8B-8B of FIG. 8A. At least a stack 210 configuring the above-described magnetic head slider 2 is formed on the substrate 3. A wafer 100 is divided into a plurality of row bars 101. The row bar 101 is a manufacturing unit for a lapping process of the air bearing surface S. The laser diode 31 is disposed on a surface U (an upper surface of the wafer in the lamination direction L) that is on an opposite side of the substrate 3 of the wafer. Therefore, the laser diode 31 is able to be disposed on the magnetic head slider 2 (the stack 210) during the wafer process. As a result, a process to attach the laser diode 31 is greatly simplified.

Figure 9:
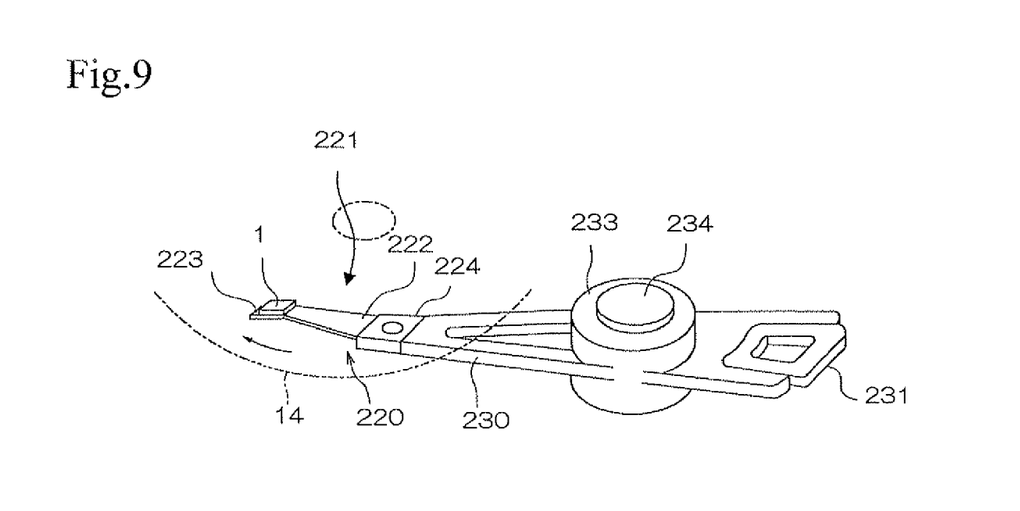
FIG. 9 is a perspective view of a head arm assembly including a head gimbal assembly in which the magnetic head of the present invention is incorporated.

FIG. 9 is a perspective view of a head arm assembly including a head gimbal assembly where the magnetic head 1 is incorporated. A head gimbal assembly 220 includes the magnetic head 1 and a suspension 221 elastically supporting the magnetic head 1. The suspension 221 includes a load beam 222, a flexure 223, and a base plate 224. The load beam 222 is formed in a plate spring shape and is made of stainless steel. The flexure 223 is arranged in one edge part of the load beam 222. The base plate 224 is arranged in the other edge part of the load beam 222. The flexure 223 is joined to the magnetic head slider 2 of the magnetic head 1 to give the magnetic bead 1 suitable flexibility. At the part of the flexure 223 to which the magnetic head 1 is attached, a gimbal part is disposed to maintain the magnetic head 1 in an appropriate orientation.

The magnetic head 1 is arranged in the hard disk device such that the magnetic head 1 faces the magnetic recording medium (hard disk) 14, which has a disk shape and is rotatably driven. In FIG. 9, the magnetic recording medium (hard disk) 14 is positioned above the magnetic head 1. When the magnetic recording medium 14 rotates in a direction of an arrow of FIG. 9, air flow passing between the magnetic recording medium 14 and the magnetic head 1 generates a downward lifting force to the magnetic head 1. The magnetic head 1 flies from the surface of the magnetic recording medium 14 due to the lifting force.

An assembly that the head gimbal assembly 220 is mounted on an arm 230 is referred to as a head arm assembly 221. The arm 230 moves the magnetic head 1 in the track crossing direction of the magnetic recording medium 14. One edge of the arm 230 is mounted on the base plate 224. On the other edge of the arm 230, a coil 231 is mounted, which forms one part of a voice coil motor. A bearing part 233 is arranged in the middle section of the arm 230. The arm 230 is rotatably supported by a shaft 234 mounted on the bearing part 233. The arm 230 and the voice coil motor for driving the arm 230 configure an actuator.

Figure 10:
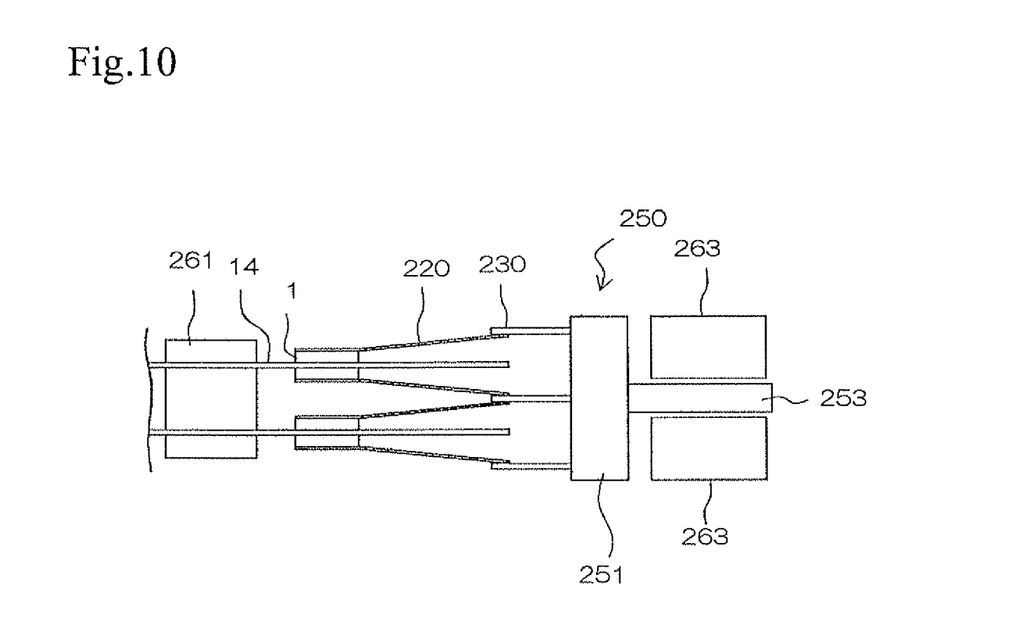
FIG. 10 is a side view of the head arm assembly in which the magnetic head of the present invention is incorporated.
Figure 11:
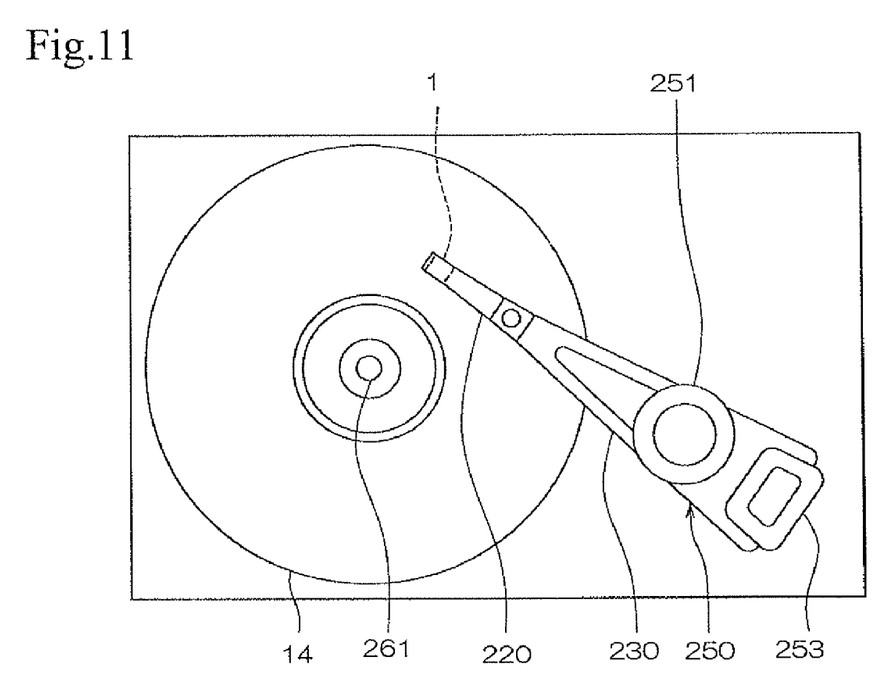
FIG. 11 is a plan view of a hard disk device in which the magnetic head of the present invention is incorporated.

Next, referring to FIGS. 10 and 11, a head stack assembly where the magnetic head 1 including the above-described magnetic head is integrated and the hard disk device will be explained. The head stack assembly includes a carriage having a plurality of arms, wherein a head gimbal assembly 220 is mounted on each arm. FIG. 10 is a side view of the head stack assembly. FIG. 11 is a plan view of the hard disk device. The head stack assembly 250 includes a carriage 251 having a plurality of arms 230. On each arm 230, the head gimbal assemblies 220 are mounted so as to align at an interval in the perpendicular direction. At the carriage 251 in the opposite side of arm 230, the coil 253 is mounted to be a part of the voice coil motor 13. The voice coil motor has permanent magnets 263 arranged facing each other on both sides of the coil 253.

Referring to FIG. 10, the head stack assembly 250 is integrated in the hard disk device. The hard disk device has a plurality of magnetic recording media 14 mounted on a spindle motor 261. For each of the magnetic recording media 14, two magnetic heads 1 are arranged facing each other through the magnetic recording medium 14. The head stack assembly 250 except for the magnetic head 1 and an actuator not only support the magnetic head 1 but also position the magnetic head 1 with respect to the magnetic recording medium 14. The magnetic head 1 is moved in the track crossing direction of the magnetic recording medium 14 by the actuator, and is positioned with respect to the magnetic recording medium 14. The magnetic head 1 records information on the magnetic recording medium 14 by the recording head, and reproduces information recorded on the magnetic recording medium 14 by the reproducing head.

A description of the preferred embodiment according to the present invention was given above in detail. However, it should be appreciated that a wide variety of alterations and modifications are possible as far as they do not depart from the spirit and scope of the attached claims.

What is claimed is:

1. A magnetic head, comprising:
   a magnetic head slider; and
   a laser diode that is positioned on a surface of a side opposite to a substrate of the magnetic head slider and that generates laser light,
   the magnetic head slider including:
      a core through which the laser light emitted from the laser diode propagates as propagating light;
      a cladding that covers the core and that has a refractive index that is smaller than that of the core;
      a near field light generating means that generates near field light from the propagating light on an air bearing surface; and
      a main pole for recording that is disposed adjacent to the near field light generating means and of which an edge part is positioned on the air bearing surface, wherein
   the core includes a reflection layer and a seed layer,
   the reflection layer has a refractive index smaller than that of the core, and has a reflection surface on which laser light emitted from the laser diode reflects so as to enter the core as the propagating light, and
   the seed layer is positioned on a back surface of the reflection surface of the reflection layer and suppresses plasmon generation on the reflection surface.

2. The magnetic head according to claim 1, wherein
   the laser diode emits the laser light inside the magnetic head slider and toward the substrate in a direction perpendicular to the surface of the opposite side, and
   the reflection layer reflects the laser light toward a direction perpendicular to the air bearing surface.

3. The magnetic head according to claim 1, wherein
   the near field light generating means includes a plasmon generator that extends to the air bearing surface along the core as facing a part of the core and that generates the near field light on the air bearing surface,
   the plasmon generator has a propagation edge extending in a longitudinal direction,
   the propagation edge includes an overlapping part that overlaps with the core in the longitudinal direction, and an edge of plasmon generator that is positioned in the vicinity of the edge part of the main pole on the air bearing surface and that generates the near field light,
   the overlapping part of the propagation edge couples the propagating light that propagates through the core in a surface plasmon mode so as to generate surface plasmon,
   the surface plasmon generated in the overlapping part propagates through the propagation edge to the edge of plasmon generator, and the propagation edge generates the near field light on the air bearing surface, and
   the laser diode is configured to emit the polarized laser light having an oscillation direction of an electric field that is in-plane with an entering surface of the laser light.

4. The magnetic head according to claim 1, wherein the seed layer is made of tantalum (Ta) or titanium (Ti), or is primarily composed of these materials.

5. The magnetic head according to claim 1, wherein the reflection layer is made of gold (Au), silver (Ag), copper (Cu) or aluminum (Al), or is primarily composed of one of these materials.

6. The magnetic head according to claim 1, wherein a thickness of the seed layer is 1 nm or more.

7. The magnetic head according to claim 1, wherein a thickness of the seed layer is from 1 mm to 70 nm inclusive.

8. The magnetic head according to claim 1, wherein a thickness of the seed layer is from 2 nm to 30 nm inclusive.

9. The magnetic head according to claim 1, wherein the core includes a spot size convertor.

10. A head gimbal assembly that includes the magnetic head according to claim 1 and a suspension that elastically supports the magnetic head.

11. A hard disk device that includes the magnetic head according to claim 1, and a device that supports the magnetic head and positions the magnetic head with respect to a magnetic recording medium.

* * * * *